(12) United States Patent
Vogt

(10) Patent No.: US 8,475,681 B2
(45) Date of Patent: Jul. 2, 2013

(54) NEUTRON SCINTILLATING MATERIALS

(75) Inventor: Thomas Vogt, Chapin, SC (US)

(73) Assignee: University of South Carolina, Columbia, SC (US)

( * ) Notice: Subject to any disclaimer, the term of this patent is extended or adjusted under 35 U.S.C. 154(b) by 212 days.

(21) Appl. No.: 13/179,732

(22) Filed: Jul. 11, 2011

(65) Prior Publication Data

US 2012/0153243 A1  Jun. 21, 2012

Related U.S. Application Data

(60) Provisional application No. 61/362,956, filed on Jul. 9, 2010.

(51) Int. Cl.
*C09K 11/61* (2006.01)
*C09K 3/00* (2006.01)

(52) U.S. Cl.
USPC .............. 252/301.4 H; 252/301.5; 252/646; 252/625

(58) Field of Classification Search
USPC ................... 252/301.4 H, 301.5, 646, 625
See application file for complete search history.

(56) References Cited

U.S. PATENT DOCUMENTS 8,168,085 B2 * 5/2012 Vogt et al. .............. 252/301.4 H
8,168,086 B2 * 5/2012 Vogt et al. .............. 252/301.4 H

* cited by examiner

*Primary Examiner* — Carol M Koslow
(74) *Attorney, Agent, or Firm* — Dority & Manning, P.A.

(57) ABSTRACT

Neutron scintillating materials are provided, including boron substitution scintillation materials, boron and Li substitution scintillation materials, and Gd-based substitution scintillation materials.

18 Claims, No Drawings

NEUTRON SCINTILLATING MATERIALS

PRIORITY INFORMATION

The present application claims priority to U.S. Provisional Patent Application Ser. No. 61/362,956 titled "Neutron Scintillating Materials" filed on Jul. 9, 2010 of Thomas Vogt, the disclosure of which is incorporated by reference herein.

BACKGROUND

Neutron detection and imaging has recently gained enormous importance in applications for homeland security with particular emphasis on detecting explosives, radioactive materials and materials associated with nuclear weapons such as plutonium, which is a significant source of fission-based neutrons. The demand of homeland security has led to a shortage of $^3$He which is used in the most common gaseous based neutron detector since large scale radiation portal monitoring systems are being deployed by the thousands.

Thus, a need exists for alternative neutron detection systems, such as neutron scintillating materials used in smaller neutron detectors for scattering and imaging.

SUMMARY

Objects and advantages of the invention will be set forth in part in the following description, or may be obvious from the description, or may be learned through practice of the invention.

Neutron scintillating materials are generally provided. In one embodiment, the neutron scintillating material can have the formula:

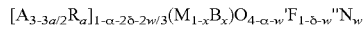

where A is Sr alone or Sr mixed with Ba and/or Ca such that A is made up of at least ⅔ mole % of Sr and ⅓ mole % or less of Ba and/or Ca; R is La, Ce, Pr, Nd, Pm, Sm, Eu, Gd, Tb, Dy, Ho, Er, Tm, Yb, Lu, Ac, Th, U, Cr, Mn, Tc, Re, Cu, Ag, Au, Zn, Cd, Hg, As, Sb, Bi, Ge, Sn, Pb, In, Tl, or combinations thereof; M is B, Al, Ga, In, W, Mo, or mixtures thereof; 0<a<0.3; α is up to about 0.2; δ is about 0.01 to about 0.15; x is about 0.01 to about 0.6, and 0≦w≦0.05 such that 0≦w'≦0.1 and 0≦w"≦0.15.

In another embodiment, the neutron scintillating material can have the formula:

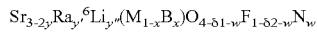

where 0<y≦1 such that 0<y'≦1 and 0<y"≦1, M is Al, Ga, In, B, W, Mo, or mixtures thereof; x is about 0.01 to about 0.6, δ is about 0.01 to about 0.15, and 0≦w≦0.05 such that 0≦w'≦0.1 and 0≦w"≦0.15.

In yet another embodiment, the neutron scintillating material can have the formula:

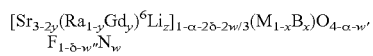

where 0<y≦1, 0<z≦1, M is Al, Ga, In, B, W, Mo, or mixtures thereof; x is about 0.01 to about 0.6, δ is about 0.01 to about 0.15, and 0≦w≦0.05 such that 0≦w'≦0.1 and 0≦w"≦0.15.

Other features and aspects of the present invention are discussed in greater detail below.

DETAILED DESCRIPTION

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth. Additionally, it is to be understood that the chemical abbreviation includes all isotopes and ions, unless otherwise stated.

Generally speaking, the present disclosure is directed to class of materials is generally disclosed for neutron detection. Particularly suitable compounds for neutron detection include boron substitution scintillation materials, boron and Li substitution scintillation materials, and Gd-based substitution scintillation materials, as described in greater detail below. However, any combination of substitutions of Li (e.g., $^6$Li), B (e.g., $^{10}$B), Gd (e.g., $^{157}$Gd, $^{nat}$Gd), or U (e.g., $^{235}$U) doping (e.g., in the A, R, and/or M locations) can be used in the general in $[A_{3-3a/2}R_a]_{1-\alpha-2\delta-2w/3}(M_{1-x}B_x)O_{4-\alpha-w'}F_{1-\delta-w''}N_w$ host lattices, as discussed in greater detail below.

The materials can be, in one particular embodiment, based on earth ions doped in host lattices according to Formula 1:

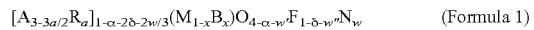 (Formula 1)

where
A is Sr alone or Sr mixed with Ba and/or Ca such that A is made up of at least ⅔ mole % of Sr and ⅓ mole % or less of Ba and/or Ca;
R is a rare earth element from the atomic numbers 57-71 (i.e., the lanthanoid series including the fifteen elements with atomic numbers 57 through 71: La, Ce, Pr, Nd, Pm, Sm, Eu, Gd, Tb, Dy, Ho, Er, Tm, Yb, and Lu), an activator (e.g., Ac, Th, U, Cr, Mn, Tc, Re, Cu, Ag, Au, Zn, Cd, Hg, As, Sb, Bi, Ge, Sn, Pb, In, Tl), and/or any combinations or mixtures thereof;
M is Al, Ga, In, B, W, Mo, and/or mixtures thereof;
0<a<0.3;
α is up to about 0.2 (e.g., about 0.01 to about 0.2);
δ is about 0.01 to about 0.15;
x is about 0.01 to about 0.6, such as about 0.4 to about 0.5 in some embodiments and about 0.1 to about 0.4 in other embodiments; and
0≦w≦0.05 such that 0≦w'≦0.1 and 0≦w"≦0.15.

As stated, certain embodiments can include doping in the A, R, and/or M locations with Li (e.g., $^6$Li), B (e.g., $^{10}$B), Gd (e.g., $^{157}$Gd, $^{nat}$Gd), U (e.g., $^{235}$U), or combinations thereof.

When nitrogen is absent (i.e., w=0), then the compound can be more simply represented by Formula 2:

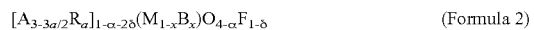 (Formula 2)

where
A is Sr alone or Sr mixed with Ba and/or Ca such that A is made up of at least ⅔ mole % of Sr and ⅓ mole % or less of Ba and/or Ca;

R is a rare earth element from the atomic numbers 57-71 (i.e., lanthanoid series comprises the fifteen elements with atomic numbers 57 through 71: La, Ce, Pr, Nd, Pm, Sm, Eu, Gd, Tb, Dy, Ho, Er, Tm, Yb, and Lu), an activator (e.g., Ac, Th, U, Cr, Mn, Tc, Re, Cu, Ag, Au, Zn, Cd, Hg, As, Sb, Bi, Ge, Sn, Pb, In, Tl), and/or any combinations or mixtures thereof;

M is Al, Ga, In, B, W, Mo, and/or mixtures thereof;

$0 < a < 0.3$;

$\alpha$ is up to about 0.2 (e.g., about 0.01 to about 0.2);

$\delta$ is about 0.01 to about 0.15; and x is about 0.01 to about 0.6, such as about 0.4 to about 0.5 in some embodiments and about 0.1 to about 0.4 in other embodiments.

Nitrogen can be incorporated into the compound of Formula 2 by streaming ammonia over an ordered oxyfluoride compound without any nitrogen present, followed by a subsequent reaction using hydrogen and/or various hydrogen/argon mixtures (creating an oxyfluoridenitride). The difference in charge between nitride (−3) and oxide (−2) and fluoride (−1) drives the relationship between w, w' and w" of the molecule shown in Formula 1. For example, two nitride anions and a defect hole are substituted for three oxide anions to balance the covalence charge of the resulting compound. Likewise, a nitride anion and two defect holes are substituted for three fluoride anions to balance the covalence charge of the resulting compound.

The compounds of Formula 1 and Formula 2 can be formed by creating defects in the oxygen and fluorine containing sub-lattice of an ordered oxyfluoride compound crystallized in a layered structure in which the layers made of isolated $MO_4$ tetrahedra separated by $A_2F^{3+}$ layers. The defects in the oxygen and fluorine sub-lattice of the ordered oxyfluoride compounds can be introduced to form the presently disclosed self-activating phosphors according to any method, such as disclosed in U.S. patent application Ser. No. 12/476,652 of Vogt, et al. filed on Jun. 2, 2009, the disclosure of which is incorporated by reference herein.

In one embodiment, the ordered oxyfluoride compound in a powder form can be exposed to a reducing gas (e.g., hydrogen, argon or hydrogen/argon mixture gas). The gas can be air or a mixture of particular gases (e.g., Ar, $H_2$, or a mixture thereof, such as Ar:$H_2$::5-10%:85-90% by volume) that can remove oxygen and fluorine atoms from the ordered oxyfluoride compound. Without wishing to be bound by theory, it is believed that the hydrogen gas reduces the self-activating phosphor to remove oxygen and fluorine atoms. Thus, the by-product gas may include water and HF gases.

Reducing the ordered oxyfluoride material can be performed at elevated temperatures to control the amount of defects created, to facilitate the reduction reactions, and to ensure that any by-product gas formed by the reaction is removed from the resulting self-activating phosphors. The temperature of this reaction with the hydrogen, argon argon/hydrogen mixture gas can be utilized to control the amount of defects present in the oxygen and fluorine sub-lattice. Generally, the temperature of the gas will be from about 200° C. to about 1000° C., such as from about 500° C. to about 1000° C. and from about 800° C. to about 1000° C.

The time the compound is exposed to the hydrogen, argon and argon/hydrogen mixture gas can be utilized to control the amount of defects present in the oxygen and fluorine sub-lattice. Generally, using a hotter hydrogen gas requires less exposure time to achieve similar defect levels, and conversely, using a lower temperature of gas requires more exposure time to achieve similar defect levels. The flow of gas can also be regulated to control the amount of defects introduced into the ordered oxyfluoride material.

The defects occur in both the oxygen and fluorine sub-lattices of the crystalline structure and introduce two additional variables ($\alpha$ and $\delta$) into the formula. The amount of defects in the oxygen and fluorine sub-lattice can be controlled as desired.

1. Boron Substitution in $[A_{3-3a/2}R_a]_{1-\alpha-2\delta-2w/3}(M_{1-x}B_x)O_{4-\alpha-w'}F_{1-\delta-w''}N_w$ Scintillation Materials Boron-10 has a larger neutron cross section (3835 barns for 2,200 m/s neutrons) and can be incorporated in solid materials with very high atomic density. Boron-10 neutron capture reaction creates gamma-radiation and heavier shorter-ranged particle products ($\alpha$ about 3-7 μm and $^7$Li less than 3 μm). This reduced range can result in a relatively high spatial resolution of $^{10}$B containing detectors.

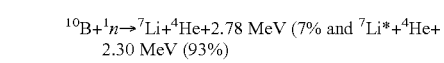

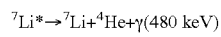

One particular embodiment of a neutron detection material is Ce-doped $[A_{3-3a/2}R_1]_{1-\alpha-2\delta-2w/3}(M_{1-x}B_x)O_{4-\alpha-w'}F_{1-\delta-w''}N_w$ (i.e., where R includes Ce). In this class of materials $^{10}$B acts as the neutron-gamma ray converter and Ce as well as other activators listed above. For example, a particularly preferred embodiment can be represented by the formula:

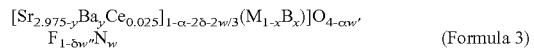
(Formula 3)

where y is up to 1 (e.g., about 0.025 to about 0.975), $\alpha$ is up to about 0.2 (e.g., about 0.01 to about 0.2); M is B, Al, Ga, In, W, Mo, and/or mixtures thereof; x is about 0.01 to about 0.6, such as about 0.4 to about 0.5 in some embodiments and about 0.1 to about 0.4 in other embodiments; δ is about 0.01 to about 0.15; and $0 \leq w \leq 0.05$ such that $0 \leq w' \leq 0.1$ and $0 \leq w'' \leq 0.15$.

In one particular embodiment, for example, M can include Al. When M consists of Al, the material can be represented by Formula 4:

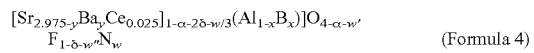
(Formula 4)

where y is up to 1 (e.g., about 0.025 to about 0.975), $\alpha$ is up to about 0.2 (e.g., about 0.01 to about 0.2); M is B, Al, Ga, In, B, W, Mo, and/or mixtures thereof; x is about 0.01 to about 0.6, such as about 0.4 to about 0.5 in some embodiments and about 0.1 to about 0.4 in other embodiments; δ is about 0.01 to about 0.15; and $0 \leq w \leq 0.05$ such that $0 \leq w' \leq 0.1$ and $0 \leq w'' \leq 0.15$. In one particular embodiment, x can be about 0.5.

2. Boron and $^6$Li Substitution in $[Sr_{3-2y}Ra_{y'}{}^6Li_{y''}]_{1-\alpha-2\delta-2w/3}(M_{1-x}B_x)O_{4-\alpha-w'}F_{1-\delta-w''}N_w$ Scintillation Materials The substitution of two $Sr^{2+}$ by 1 $Ra^{3+}$ and one $^6$Li+ in boron or non-boron containing in $Sr_{3-2y}Ra_{y'}{}^6(M_{1-x}B_x)O_{4-\delta1-w}F_{1-\delta2-w}N_w$ scintillation materials uses the neutron's interaction with $^6$Li to detect neutrons, where $0 < y \leq 1$ such that $0 < y' \leq 1$ and $0 < y' \leq 1$ (in one embodiment, y, y', and/or y" can be substantially equal). The neutron cross section of 6Li is 940 barns for neutrons with velocities of 2,200 m/s creating a triton and an alpha particle. While having a lower neutron cross section 6Li based scintillators do not produce gamma radiation.

3. Gd-Based Neutron Detection in $[Sr_{3-2y}(Ra_{1-y}Gd_y)^6Li_2]_{1-\alpha-2\delta-2w/3}(M_{1-x}B_x)O_{4-\alpha-w'}F_{1-\delta-w''}N_w$ Scintillation Materials Gadolinium is used mainly in neutron imaging since the isotope $^{157}$Gd has an enormous resonance at thermal neutron energies (49700 barns for 2,200 ms neutrons). Neutron capture results in a spectrum of high energy gamma rays and conversion electrons between 29 and 182 keV. These conversion electrons excite the activators in the oxyfluoride host lattice of the neutrons detector. These Gd-based neutron detectors are used for white-beam imaging and used to suppress any potential fast or epithermal neutron background. Preferred embodiments of neutron detecting materials are $[Sr_{3-y}Gd_y]_{1-\alpha-2\delta-2w/3}(M_{1-x}B_x)O_{4-\alpha-w'}F_{1-\delta-w''}N_w$ for small y (e.g., where y is about 0.01 to about 0.1) and $[Sr_{3-2y}Gd_y(Li, Na, and/or K)_x]_{1-\alpha-2\delta-2w/3}(M_{1-x}B_x)O_{4-\alpha-w'}F_{1-\delta-w''}N_w$ (e.g., where y is about 0.1 to about 0.5).

These and other modifications and variations to the present invention may be practiced by those of ordinary skill in the art, without departing from the spirit and scope of the present invention, which is more particularly set forth in the appended claims. In addition, it should be understood the aspects of the various embodiments may be interchanged both in whole or in part. Furthermore, those of ordinary skill in the art will appreciate that the foregoing description is by way of example only, and is not intended to limit the invention so further described in the appended claims.

What is claimed:

1. A neutron scintillating material having to the formula:

$$[A_{3-3a/2}R_a]_{1-\alpha-2\delta-2w/3}(M_{1-x}B_x)O_{4-\alpha-w'}F_{1-\delta-w''}N_w$$

where A is Sr alone or Sr mixed with Ba and/or Ca such that A is made up of at least ⅔ mole % of Sr and ⅓ mole % or less of Ba and/or Ca; R is La, Ce, Pr, Nd, Pm, Sm, Eu, Gd, Tb, Dy, Ho, Er, Tm, Yb, Lu, Ac, Th, U, Cr, Mn, Tc, Re, Cu, Ag, Au, Zn, Cd, Hg, As, Sb, Bi, Ge, Sn, Pb, In, Tl, or combinations thereof; M is B, Al, Ga, In, W, Mo, or mixtures thereof; $0<a<0.3$; $\alpha$ is up to about 0.2; $\delta$ is about 0.01 to about 0.15; x is about 0.01 to about 0.6, and $0 \leq w \leq 0.05$ such that $0 \leq w' \leq 0.1$ and $0 \leq w'' \leq 0.15$.

2. The neutron scintillating material as in claim 1, wherein the neutron scintillating material includes doping in the A, R, and/or M locations with Li, B, Gd, U, or combinations thereof.

3. The neutron scintillating material as in claim 1, wherein w is 0, w' is 0 and w" is 0.

4. The neutron scintillating material as in claim 1, wherein x is about 0.4 to about 0.5.

5. The neutron scintillating material as in claim 1, wherein x is about 0.1 to about 0.4.

6. The neutron scintillating material as in claim 1, wherein R includes Ce.

7. The neutron scintillating material as in claim 6, wherein the neutron scintillating material has the formula:

$$[Sr_{2.975-y}Ba_yCe_{0.025}]_{1-\alpha-2\delta-2w/3}(M_{1-x}B_x)]O_{4-\alpha-w'}F_{1-\delta-w''}N_w$$

where y is up to 1, $\alpha$ is up to about 0.2; M is Al, Ga, In, B, W, Mo, and/or mixtures thereof; x is about 0.01 to about 0.6; $\delta$ is about 0.01 to about 0.15; and $0 \leq w \leq 0.05$ such that $0 \leq w' \leq 0.1$ and $0 \leq w'' \leq 0.15$.

8. The neutron scintillating material as in claim 7, wherein y is about 0.025 to about 0.975.

9. The neutron scintillating material as in claim 7, wherein $\alpha$ is about 0.01 to about 0.2.

10. The neutron scintillating material as in claim 7, wherein w is 0, w' is 0 and w" is 0.

11. The neutron scintillating material as in claim 7, wherein M includes Al.

12. The neutron scintillating material as in claim 11, wherein the neutron scintillating material has the formula:

$$[Sr_{2.975-y}Ba_yCe_{0.025}]_{1-\alpha-2\delta-2w/3}(Al_{1-x}B_x)]O_{4-\alpha-w'}F_{1-\delta-w''}N_w$$

where y is up to 1, $\alpha$ is up to about 0.2; x is about 0.01 to about 0.6; $\delta$ is about 0.01 to about 0.15; and $0 \leq w \leq 0.05$ such that $0 \leq w' \leq 0.1$ and $0 \leq w'' \leq 0.15$.

13. The neutron scintillating material as in claim 12, wherein x is about 0.5.

14. A neutron scintillating material having the formula:

$$Sr_{3-2y}Ra_y{}^6Li_{y''}(M_{1-x}B_x)O_{4-\delta 1-w'}F_{1-\delta 2-w''}N_w$$

where $0<y\leq 1$ such that $0<y'\leq 1$ and $0<y''\leq 1$, M is Al, Ga, In, B, W, Mo, or mixtures thereof; x is about 0.01 to about 0.6, $\delta$ is about 0.01 to about 0.15, and $0 \leq w \leq 0.05$ such that $0 \leq w' \leq 0.1$ and $0 \leq w'' \leq 0.15$.

15. The neutron scintillating material as in claim 14, wherein y, y', and y" are substantially equal to each other.

16. A neutron scintillating material having the formula:

$$[Sr_{3-2y}(Ra_{1-y}Gd_y)^6Li_z]_{1-\alpha-2\delta-2w/3}(M_{1-x}B_x)O_{4-\alpha-w'}F_{1-\delta-w''}(N_w$$

where $0<y\leq 1$, $0<z\leq 1$, M is Al, Ga, In, B, W, Mo, or mixtures thereof; x is about 0.01 to about 0.6, $\delta$ is about 0.01 to about 0.15, and $0 \leq w \leq 0.05$ such that $0 \leq w' \leq 0.1$ and $0 \leq w'' \leq 0.15$.

17. The neutron scintillating material as in claim 16, wherein the neutron scintillating material has the formula:

$$[Sr_{3-y}Gd_y]_{1-\alpha-2\delta-2w/3}(M_{1-x}B_x)O_{4-\alpha-w'}F_{1-\delta-w''}N_w$$

where y is about 0.01 to about 0.1.

18. The neutron scintillating material as in claim 16, wherein the neutron scintillating material has the formula:

$$[Sr_{3-2y}Gd_y(Li, Na, and/or K)_x]_{1-\alpha-2\delta-2w/3}(M_{1-x}B_x)O_{4-\alpha-w'}F_{1-\delta-w''}N_w$$

where y is about 0.1 to about 0.5.

* * * * *